United States Patent
Schmitz et al.

(10) Patent No.: US 8,042,791 B2
(45) Date of Patent: Oct. 25, 2011

(54) SELF-PUMPING HYDROPNEUMATIC SHOCK ABSORBER

(75) Inventors: Klaus Schmitz, Eitorf (DE); Roland Krupp, Hennef (DE)

(73) Assignee: ZF Friedrichshafen AG, Friedrichshafen (DE)

(*) Notice: Subject to any disclaimer, the term of this patent is extended or adjusted under 35 U.S.C. 154(b) by 1253 days.

(21) Appl. No.: 11/725,263

(22) Filed: Mar. 19, 2007

(65) Prior Publication Data
US 2007/0221457 A1 Sep. 27, 2007

(30) Foreign Application Priority Data
Mar. 22, 2006 (DE) .................. 10 2006 013 072

(51) Int. Cl.
*F16F 9/14* (2006.01)
(52) U.S. Cl. .................. 267/64.17; 267/DIG. 2
(58) Field of Classification Search ............. 267/64.17, 267/DIG. 1, DIG. 2
See application file for complete search history.

(56) References Cited

U.S. PATENT DOCUMENTS

| | | | | |
|---|---|---|---|---|
| 3,391,922 A | * | 7/1968 | Axthammer | 267/64.17 |
| 3,593,978 A | * | 7/1971 | Lohr | 267/64.17 |
| 4,577,840 A | * | 3/1986 | Meller et al. | 267/64.17 |
| 6,234,462 B1 | * | 5/2001 | Beck et al. | 267/64.17 |
| 2005/0189186 A1 | | 9/2005 | Beck et al. | |

* cited by examiner

*Primary Examiner* — Bradley King
(74) *Attorney, Agent, or Firm* — Cozen O'Connor

(57) ABSTRACT

Self-pumping hydropneumatic shock absorber with internal level control, with an oil-filled working cylinder under the pressure of gas cushions and with a damping piston, which is attached to the end of a hollow piston rod and can slide back and forth in the working cylinder, the hollow space in the piston rod serving as the pump space of a pump rod attached to the working cylinder. Oil is drawn from a reservoir space when the piston rod travels outward and into the working space when the piston rod travels inward, and where a control opening is provided in the pump rod to compensate for pressure differences between the working spaces. At least one throttle acting as a function of pressure is provided in the pump space between the high-pressure gas cushion and the low-pressure gas cushion.

9 Claims, 4 Drawing Sheets

SELF-PUMPING HYDROPNEUMATIC SHOCK ABSORBER

BACKGROUND OF THE INVENTION

1. Field of the Invention

The invention pertains to a self-pumping hydropneumatic shock absorber with internal level control, with an oil-filled working cylinder under the pressure of gas cushions and with a damping piston, which is attached to the end of a hollow piston rod and can slide back and forth in the working cylinder, the hollow space in the piston rod receiving a pump rod attached to the working cylinder, where oil is drawn from a reservoir space when the piston rod travels outward and into the working space when the piston rod travels inward, and where a control opening is provided in the pump rod to compensate for pressure differences between the working spaces.

2. Description of the Related Art

US 2005/0189186 discloses a self-pumping hydropneumatic shock absorber with internal level control wherein the damping piston is installed with freedom of axial movement in a working cylinder, where this damping piston is subjected to the pressure of a high-pressure gas cushion and of a low-pressure gas cushion. The damping piston is mounted on the end of a hollow piston rod, where the hollow space in the piston rod is designed as a pump space. A pump rod attached to the working cylinder projects into the hollow piston rod, so that, when the piston rod travels outward, it draws oil from a reservoir space, and when it travels inward, it transports this oil into the working space. When the vehicle reaches the desired level, a control opening is released, so that the pressures are equalized inside the shock absorber. The actual throttle in this case is designed as a bypass, where the flow of oil from the high-pressure space to low-pressure space is determined by a predetermined cross section of the bypass. In cases such as this where the cross section is fixed, the quantity of oil which can flow through the bypass is highly dependent on pressure. This pressure dependence is basically undesirable.

SUMMARY OF THE INVENTION

An object of the invention is to create a self-pumping, hydropneumatic shock absorber with internal level control, in which the quantity of oil which can flow through the throttle bore is independent of pressure, the cross section of the bore being smaller at high pressures than at low pressures.

According to the invention, at least one throttle which acts as a function of pressure is provided in the pump space between the high-pressure gas cushion and the control opening leading to the low-pressure gas cushion.

It is advantageous here that the oil flow rate is variable.

The throttle is preferably located in an element which is installed in the pump space with the freedom to move axially back and forth as a function of pressure. It is advantageous here that, to design the variable discharge cross section (throttle), the throttle is provided with a fixed throttle cross section, which is free to move in the axial direction. The element is preferably cylindrical in shape.

According to another feature, a resilient force can act on the end surface of the element facing away from the high-pressure gas cushion. It is advantageous for a mechanical spring and/or a gas spring to provide the resilient force.

A bore, notch, or groove can provide the fixed throttle.

According to another embodiment, the element has at least one seal on its outer circumference to exert a sealing action against the inside wall of the pump space.

The inside wall of the pump space can be provided with at least one stop, which limits the axial movement of the element.

In yet another embodiment, the throttle can be blocked off as a function of distance, i.e. block progressively as it travels. A conical element, which cooperates with the bore of the throttle, can be used for blocking. It is also advantageous for the conical element to have a fixed bypass groove.

At least one control opening cam be provided in the wall of the pump space. It is advantageous here for the oil flowing from the high-pressure space to the low-pressure space to push the element toward the low-pressure side, the element thus traveling over one or more control openings located laterally in the pump space, releasing or closing one or more of these control openings as it moves. When all of the control openings are closed, pressure differences are compensated only by way of the fixed throttle in the element.

The slide can be provided with a nonreturn valve in parallel with the throttle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
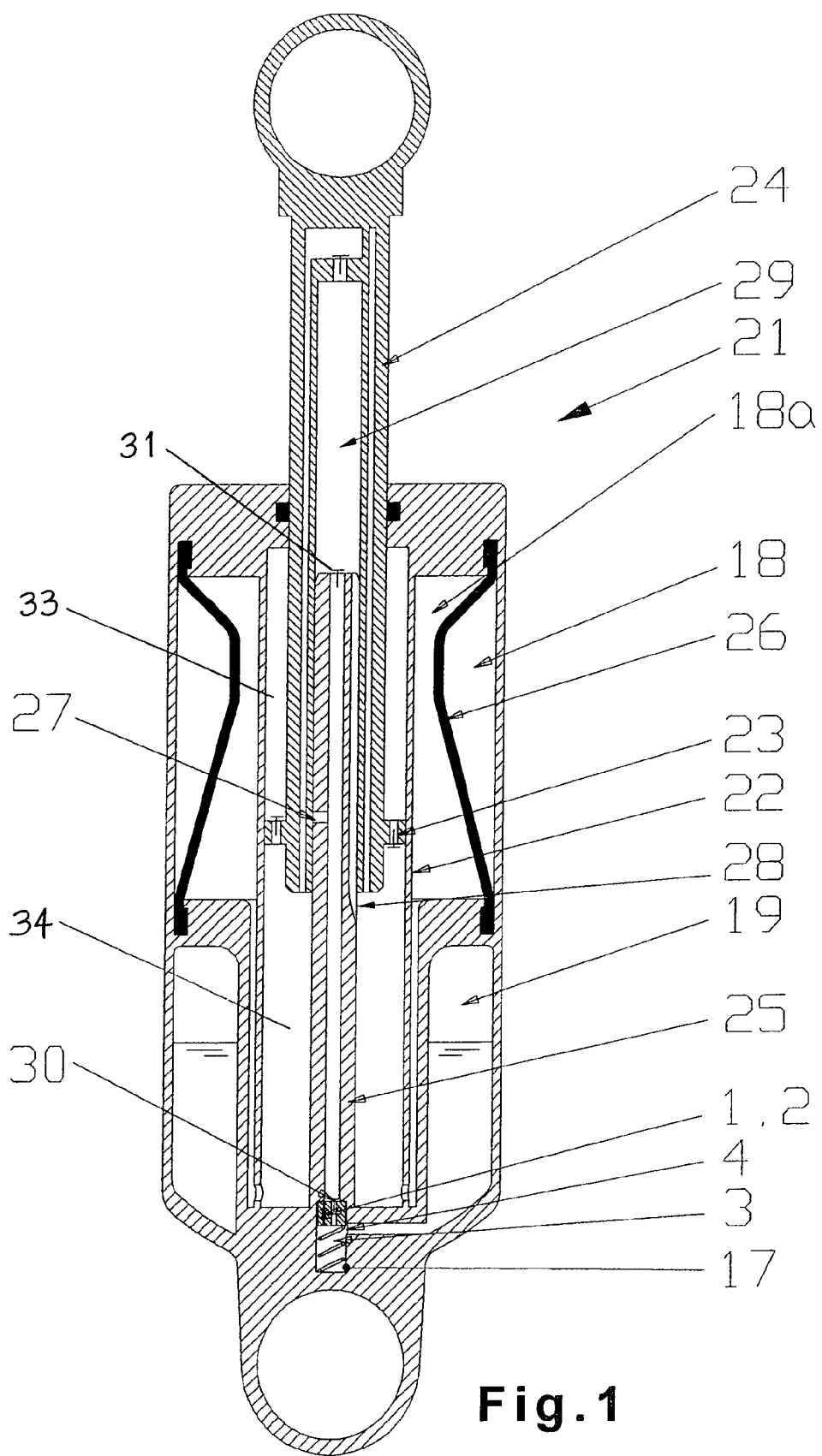
FIG. 1 shows a cross section of a self-pumping hydropneumatic shock absorber with internal level control.

The self-pumping hydropneumatic shock absorber 21 for motor vehicles shown in FIG. 1 includes a working cylinder 22, in which a damping piston 23, attached to the end of a hollow piston rod 24, slides. The working cylinder 22 is closed off at one end by an end wall and at the other end by the piston rod guide, through which the hollow piston rod 24 exits to the outside in a sealed manner. At the top, the shock absorber is attached by a mounting eye on the piston rod to the body of the vehicle, and at the bottom end of the shock absorber the cylinder 22 is attached by means of another fastening eye to the axle of the vehicle (not shown). The working cylinder 22 is surrounded by a ring-shaped compensating chamber filled partially with oil and partially with gas. The corresponding chamber is divided by an intermediate wall into a high-pressure gas cushion 18 and a low-pressure gas cushion 19. The high-pressure gas cushion 18 in the high-pressure chamber 18a is separated from an oil space by a partition 26. In the fully equalized state, that is, in the state in which the pressure has not been pumped up, the pressure in the low-pressure chamber 19 is the same as that in the high-pressure chamber 18.

The low-pressure chamber 19 and the high-pressure chamber 18a are both connected to the working cylinder 22. The working cylinder 22 is divided by the damping piston 23 into an upper working space 33 and a lower working space 34; the damping piston 23 has damping valves for both the pull stage and the push stage.

The actual level control of the self-pumping hydropneumatic shock absorber 21 is handled by the pump rod 25, which cooperates with the hollow space in the piston rod 24 to form a pump. During the operation of the vehicle, the relative movement between the pump rod 25 and the piston rod 24 conveys damping medium from the low-pressure chamber 19 into the pump space 29 by way of valves 30, 31. Thus the damping piston 23 is moved progressively outward until a bypass 28 establishes a connection between the pump space 29 and 34.

At this point, the pumping action of the pump is suppressed; the dynamic level of the vehicle is reached. When the load is removed from the vehicle, the damping piston 23 is first pushed further outward by the high-pressure gas cushion 18 until the discharge bore 27 is released and the pressure inside the shock absorber 21 can equalize. The piston rod 24 with the damping piston 23 is now pushed inward.

Figure 2:
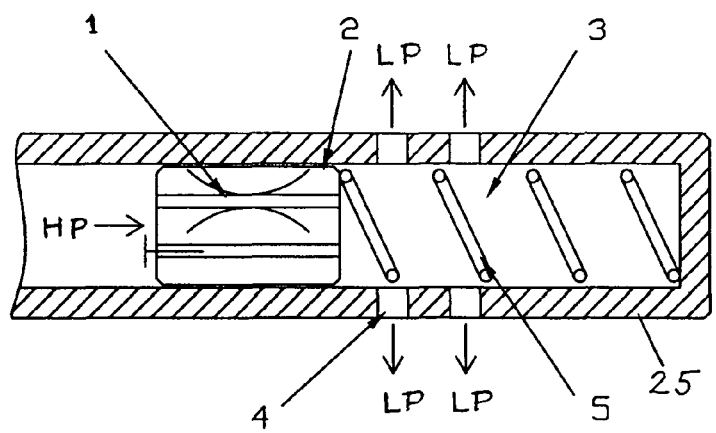
FIGS. 2-10 show cross sections of various embodiments of a throttle in isolation.

FIG. 2 shows a throttle 1 in isolation. It is provided in a slide element 2 inside the pump space 3. The slide element 2 is free to move back and forth in the axial direction. The element 2 a cross section which deviates from a cylindrical cross section.

The throttle 1 in the slide element 2 has a fixed cross section, and the check valve 30 opens while the piston rod 24 is extending. The element 2 slides back and forth inside the pump rod 25. When the oil flows from the high-pressure chamber 18a into the low-pressure chamber 19, the element 2 is pushed toward the low-pressure side and thus travels over one or more of the control openings 4 in the pump rod 25, thereby varying the discharge cross-section. As a result, the connection leading to the low-pressure gas cushion 19 is interrupted. Via the cross section of the throttle 1, the oil pressures on the two sides of the element 2 equalize. During the process of pressure equalization, the elastic force 5 in the form of a mechanical spring 5a pushes the element 2 toward the high-pressure gas cushion 18, so that oil can flow again into the low-pressure chamber 19. An equilibrium is thus established between the pressure differences and the elastic force 5. The smaller the pressure difference between the high-pressure gas cushion 18 and the low-pressure gas cushion 19, the larger the effective discharge cross section.

As a result of the presence of the element 2, the goal is achieved that, when the vehicle is decelerated rapidly (e.g., full braking) and thus the discharge bores 27 are released for a short time, the loss of oil from the high-pressure chamber 18 to the low-pressure chamber 19 is reduced or even prevented entirely, and thus the lowering of the rear of the vehicle is slowed down or eliminated completely.

Figure 3:
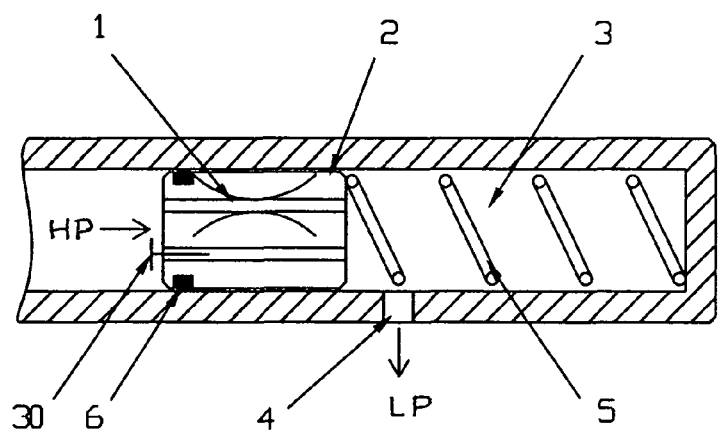

FIG. 3 shows a variant in which the element 2 contains a seal 6 to prevent gap leaks between the element 2 and the pump space 3 before the flow through the throttle 1.

Figure 4:
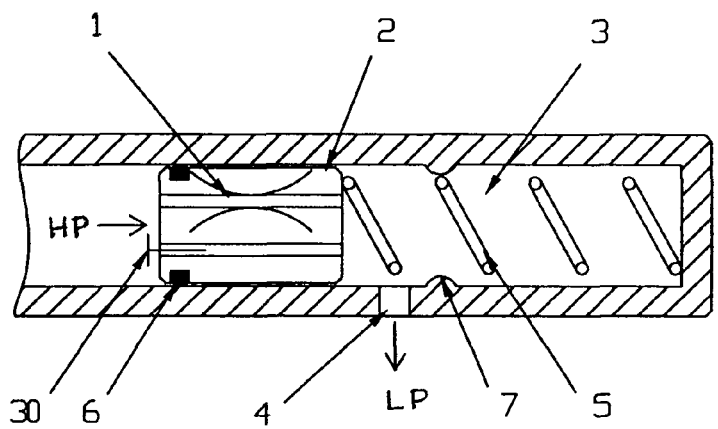

According to FIG. 4, a stop 7 is provided in the pump space 3. This stop serves as a metal valve seat against which the slide element 2 comes to rest.

Figure 5:
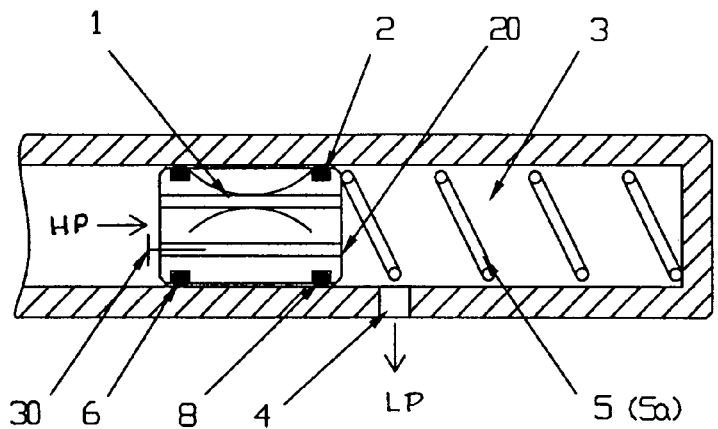

FIG. 5 shows an element 2 provided with an additional seal 8, so that gap leakage after the flow through the throttle 1 in the element 2 can be prevented.

Figure 6:
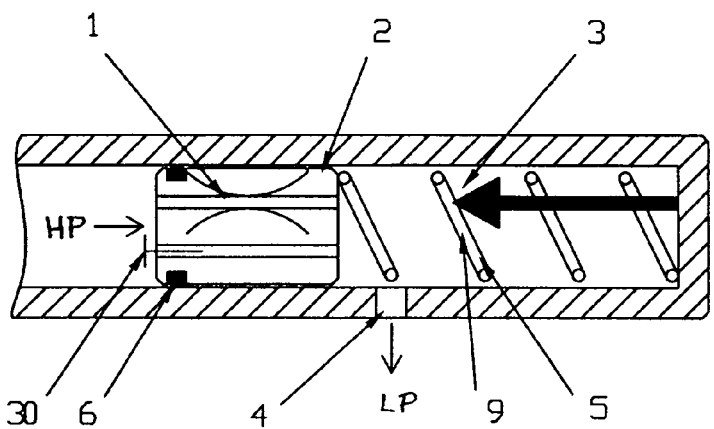

FIG. 6 shows another variant, in which the slide element 2 comes into contact with a conical element 9 as it travels axially inside the pump space 3. The conical element thus acts as a valve, interrupting the flow of oil from the throttle 1 to the low-pressure chamber.

Figure 7:
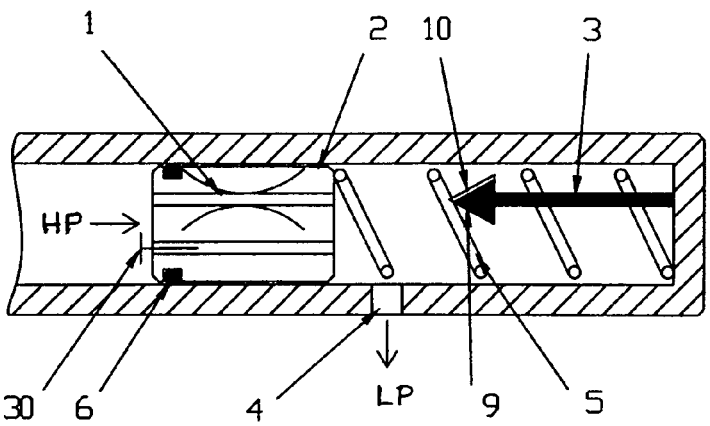

FIG. 7 shows an embodiment basically the same as that according to FIG. 6, except that a bypass groove 10 is provided on the conical element 9, so that a minimal oil stream can flow continuously between the high-pressure chamber and the low-pressure chamber, depending on the pressure relationships.

Figure 8:
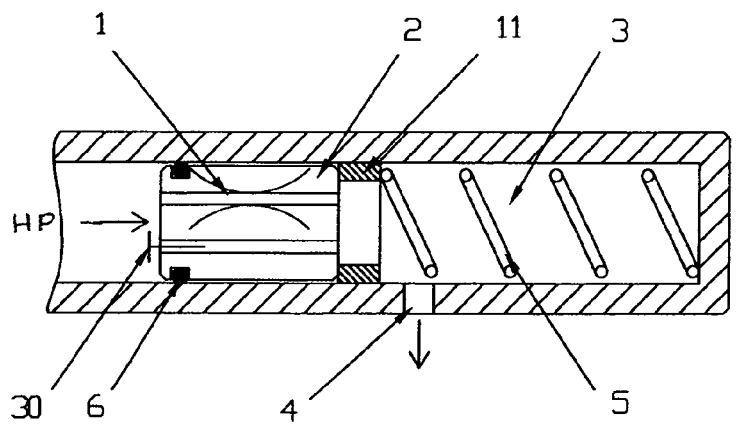

FIG. 8 shows another embodiment, in which a control ring 11 is installed in front of the slide element 2. The mechanical spring 5a can be supported against this ring.

Figure 9:
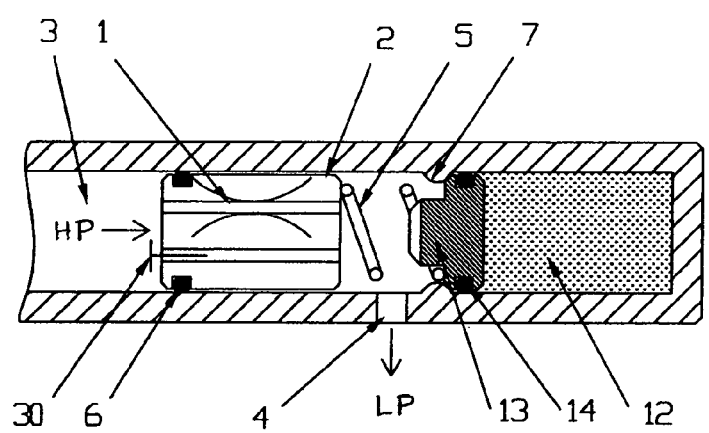

FIG. 9 shows a throttle 1, in which the element 2 is again installed with freedom of axial movement in the pump space 3, but here, in addition to the mechanical spring 5a, a gas spring 12 is also provided. The gas spring 12 is separated from the oil-supplied pump space 3 by a separating element (e.g., a separating piston, a membrane) 13 and a seal 14. At high pressures, the resulting force of the spring 5a is reduced, so that an even more effective delaying action can be achieved.

Figure 10:
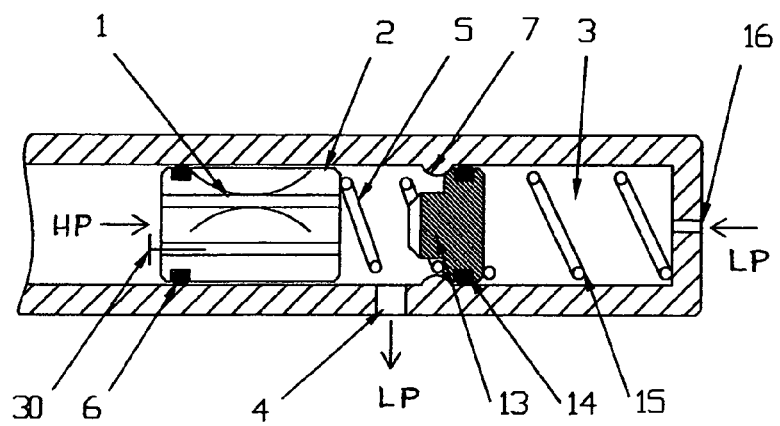

As another possibility, FIG. 10 shows an embodiment which is similar in principle to that of FIG. 9, except that here the separating element 13 is actuated by another spring 15, where a bore 16 establishes a connection to the low-pressure space. The way in which this embodiment functions is the same in principle to that of the embodiment according to FIG. 9.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A self-pumping hydropneumatic shock absorber comprising:
   a working cylinder having a working space filled with hydraulic oil;
   a hollow pump rod fixed coaxially in the working cylinder;
   a high pressure chamber containing hydraulic oil and a high pressure gas cushion;
   a low pressure chamber containing hydraulic oil and a low pressure gas cushion;
   a damping piston which is movable in the working cylinder, the damping piston being attached to the end of a hollow piston rod which can slide on the pump rod, the piston drawing oil from at least one of the chambers into the working space when the piston rod travels outward, and pumping oil from the working space into at least one of the chambers when the piston rod travels inward;
   a discharge bore in the pump rod to compensate for pressure differences between the working spaces;
   a pump space between the between the high pressure chamber and the low pressure chamber, the pump space having a throttle which acts as a function of pressure difference between the chambers; and
   a slide element which is movable in the pump space as a function of pressure difference between the chambers, the throttle being provided in the slide element, wherein the slide element slides against an inside wall of the pump space, the slide element carrying a seal which exerts a sealing action against the inside wall.

2. The self-pumping hydropneumatic shock absorber of claim 1 wherein the slide element is biased toward the high pressure chamber.

3. The self-pumping hydropneumatic shock absorber of claim 2 further comprising a spring which biases the slide element toward the high pressure chamber, the spring comprising at least one of a mechanical spring and a gas spring.

4. The self-pumping hydropneumatic shock absorber of claim 1 wherein the slide element slides against an inside wall of the pump space, the inside wall having an axial stop which limits movement of the slide element.

5. The self-pumping hydropneumatic shock absorber of claim 1 wherein the throttle is blocked as a function of movement of the slide element.

6. The self-pumping hydropneumatic shock absorber of claim 5 wherein the throttle comprises a throttle bore, the shock absorber further comprising a conical element which is received in the throttle bore to block the throttle.

7. The self-pumping hydropneumatic shock absorber of claim 6 wherein the conical element is provided with a bypass groove which allows a minimal oil flow when the conical element is received in the throttle bore.

8. The self-pumping hydropneumatic shock absorber of claim 1 wherein the pump space has an inside wall provided with at least one control opening communicating with said low pressure chamber, said slide element being movable to cover at least one said control opening and thereby at least partially block communication between said high pressure chamber and said low pressure chamber.

9. The self-pumping hydropneumatic shock absorber of claim 1 wherein said slide element comprises a check valve which permits flow from said low pressure chamber when said pump rod is extended.

* * * * *